United States Patent [19]
Dufour

[11] Patent Number: 5,651,732
[45] Date of Patent: Jul. 29, 1997

[54] LEAK-PROOF VENTING SYSTEM

[75] Inventor: Eric Dufour, Rosemère, Canada

[73] Assignee: Security Chimneys International Inc., Laval, Canada

[21] Appl. No.: 626,570

[22] Filed: Apr. 2, 1996

[51] Int. Cl.$^6$ .................................................. F23J 13/04
[52] U.S. Cl. .................. 454/47; 126/307 R; 285/361
[58] Field of Search .................. 454/1, 47; 126/307 R; 285/361

[56] References Cited

U.S. PATENT DOCUMENTS

| | | | |
|---|---|---|---|
| 177,729 | 5/1876 | Loring . | |
| 458,636 | 9/1891 | Meilink et al. | 285/361 X |
| 793,869 | 7/1905 | Anderson | 285/361 X |
| 796,084 | 8/1905 | Orr . | |
| 1,181,060 | 4/1916 | Bennett | 285/361 X |
| 1,217,805 | 2/1917 | Meyers . | |
| 1,281,307 | 10/1918 | Dow et al. . | |
| 1,885,321 | 11/1932 | Benn | 285/361 X |
| 2,562,014 | 7/1951 | Buhayar | 285/361 X |
| 3,233,927 | 2/1966 | Dewhirst | 285/401 |
| 4,746,149 | 5/1988 | Thompson | 285/361 X |
| 4,820,285 | 4/1989 | Leise et al. | 604/339 |
| 4,911,573 | 3/1990 | Pietro | 285/361 X |
| 5,256,077 | 10/1993 | Mattingly et al. | 439/314 |
| 5,318,332 | 6/1994 | Hohmann et al. | 285/361 X |

*Primary Examiner*—Harold Joyce
*Attorney, Agent, or Firm*—Robic

[57] ABSTRACT

Flue sections and an airtight venting system being made therefrom by connecting in line the flue sections. The flue section has a pair of opposite ends of circular cross-section one of which called "male end" is shaped and sized to fit into the other end, called "female end" of a similar flue section. The male end comprises at least two outwardly-projecting L-shaped grooves, a peripheral outwardly-opening recess and an O-ring mounted therein and protruding outwardly. The L-shaped grooves are positioned in such a manner to have an opening at the male end of the flue section. The recess is positioned at a distance "H" from the L-shaped groove. The female end comprises at least two inwardly-projecting keys sized and shaped to engage the L-shaped grooves of the male end of another flue section in order to lock the male end into the female end by insertion and twisting of the ends together, forming a "bayonet" type connection and a peripheral inwardly-projecting boss positioned at the distance "H" from the keys in such a manner to be aligned and pressed against the O-ring of the other flue section, making a tight seal when the male end of the other flue section is fitted into the female end of the flue section.

10 Claims, 4 Drawing Sheets

LEAK-PROOF VENTING SYSTEM

FIELD OF THE INVENTION

The present invention relates to flue sections and to an airtight venting system made by connecting in line such flue sections.

DESCRIPTION OF THE PRIOR ART

As is known, wood, oil and gas burning appliances, stoves or fireplaces are commonly used for heating houses and buildings during the cold months of the year, or for cooking. Vapours such as smoke and gases are given off from combustion of these materials. The vapours escape through a flue or a venting system connected to the appliance and leading to the roof and to the exterior of the house or building equipped with the appliance.

The flue or venting system usually comprises a plurality of flue sections of a given length which are connected to each other in line to form a duct or a chimney. Most of the time, such system comprises two sets of flue sections, viz. a set of inner flue sections directly connected to the flue of the appliance, stove or fireplace and acting as the chimney per se, and a second set of outer flue sections surrounding the first set and acting as a thermal shield.

Stringent safety regulations require that the connections between the flue sections of a least one of the two sets, viz. the inner or the outer one, be air-tight, especially when the appliance, stove or fireplace is supplied with gas, so that the leak loss be lower than 25 cubic feet per three hours under an air pressure of 25 Pa.

To comply with these regulations, the sections are sealed with a duct tape or they are fitted tightly together. Bayonet type connections have been known in this field for more than 90 years as evidenced by U.S. Pat. Nos. 796,084; 1,217,805; 1,281,307 and 3,233,927. However, none of these patents discloses or suggests to use an O-ring to make a tight seal.

In any event, sealing of one of the sets, most commonly the outer set, increases the amount of time and material required to complete the installation of the venting system. When the sections are fitted tightly together without any tape or seal, they may loosen up after a while, thereby causing the flue to leak gases.

OBJECT AND SUMMARY OF THE INVENTION

The object of the present invention is to provide an improved flue section of very simple yet efficient structure, which can be connected in line to similar flue sections in such a manner as to form an airtight venting system or chimney which is simple to install.

More particularly, the invention provides a flue section having a pair of opposite ends of circular cross-section. One of the ends, hereinafter called the "male end", is shaped and sized to fit into the other end, hereinafter called the "female end", of a similar flu& section. Both ends have inner and outer surfaces. The male end comprises at least two L-shaped grooves, a peripheral outwardly-opening recess and an O-ring.

The L-shaped grooves are located on the outer surface of the male end. Each L-shaped groove has a first and a second arm. The grooves are positioned in such a manner to have the first arm opening at the male end of the flue section while the second arm extends toward the female end of the flue section at a fixed angle.

The recess is positioned at a distance "H" from the second arm of the L-shaped grooves. The O-ring is mounted in the recess and is protruding outwardly.

The female end comprises at least two inwardly-projecting keys and a peripheral inwardly-projecting boss.

The keys are sized and shaped to engage the L-shaped grooves of the male end of another flue section in order to lock the male end into the female end by insertion and twisting of the male and female end together, thereby forming a "bayonet" type connection.

The boss is positioned at the distance "H" from the keys in such a manner to be aligned and pressed against the O-ring of the other flue section and thus to make a tight seal when the male end of the other flue section is fitted into the female end of the flue section.

Preferably, the male end of the flue section has a given length and comprises a flange limiting its insertion within the female end of another similar flue section. Accordingly, beyond this given length, the diameter of the flue section is increased to be equal to the diameter of the female end. Consequently, the female end cannot be fitted further than the distance of the male end, after which both diameters of the flue sections are equal.

Another object of the present invention is to provide an airtight venting system.

More particularly, the invention provides an airtight venting system comprising a plurality of flue sections connected in line to each other.

The flue section of the present invention provides an airtight and leak proof venting system exceeding many times the standard leakage requirements, thereby ensuring that the appliances perform to its expected level. Furthermore, the flue sections of the present invention are easy to connect to each other.

BRIEF DESCRIPTION OF THE DRAWINGS

The present invention will be more easily understood upon reading of the following non-restrictive description of a preferred embodiment thereof, made with reference to the accompanying drawings in which.

For the purpose of simplicity, the same numeral references have been used throughout the description and drawings to identify the same structural elements.

DESCRIPTION OF A PREFERRED EMBODIMENT OF THE INVENTION

Figure 1:
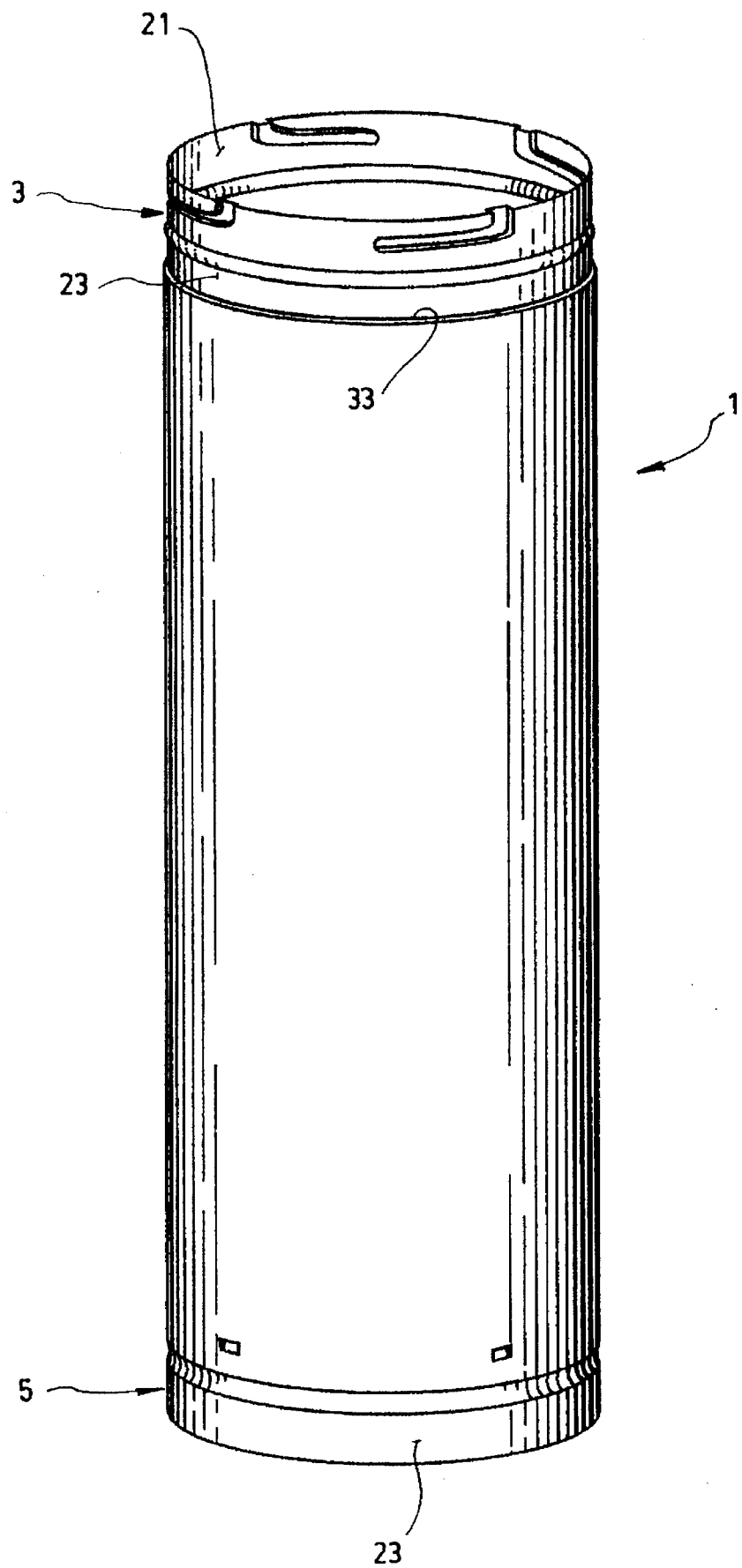
FIG. 1 is a perspective view of a flue section according to the invention.

FIG. 1 shows a flue section (1) according to the invention. As is shown, the flue section (1) has a male end (3) and a female end (5), both forming a pair of opposite ends of circular cross-section. Each of the male and female ends (3,5) has an inner surface (21) and an outer surface (23).

Figure 2:
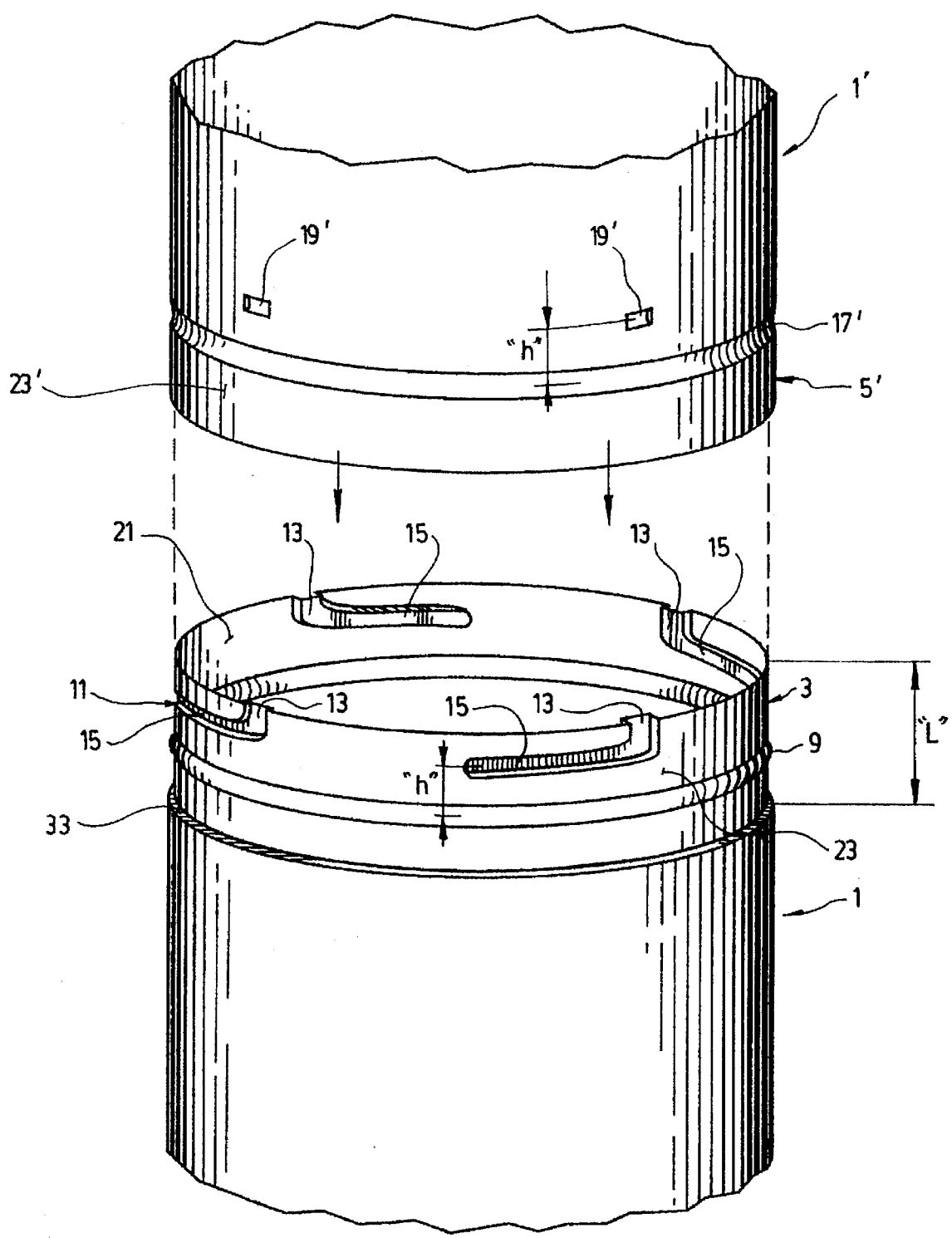
FIG. 2 is an enlarged perspective view of a male and a female end of two flue sections similar to the one illustrated in FIG. 1, the ends of the two flue sections being shown aligned in position to be connected to each other.

FIG. 2 shows in detail the male end (3) of the flue section (1) and the female end (5') of a similar flue section (1'). The male end (3) comprises four L-shaped grooves (11) on the outer surface (23) of the flue section (1). Each L-shaped groove (11) has a first and a second arm (13,15). The L-shaped grooves (11) are positioned in such a manner to have the first arm (13) opening at the male end (3) of the flue section (1) while the second arm (15) extends toward the opposite female end of the flue section (1) at a fixed angle. The male end (3) is shaped and sized to fit into the female end (5') of the other flue section (1').

Figure 3:
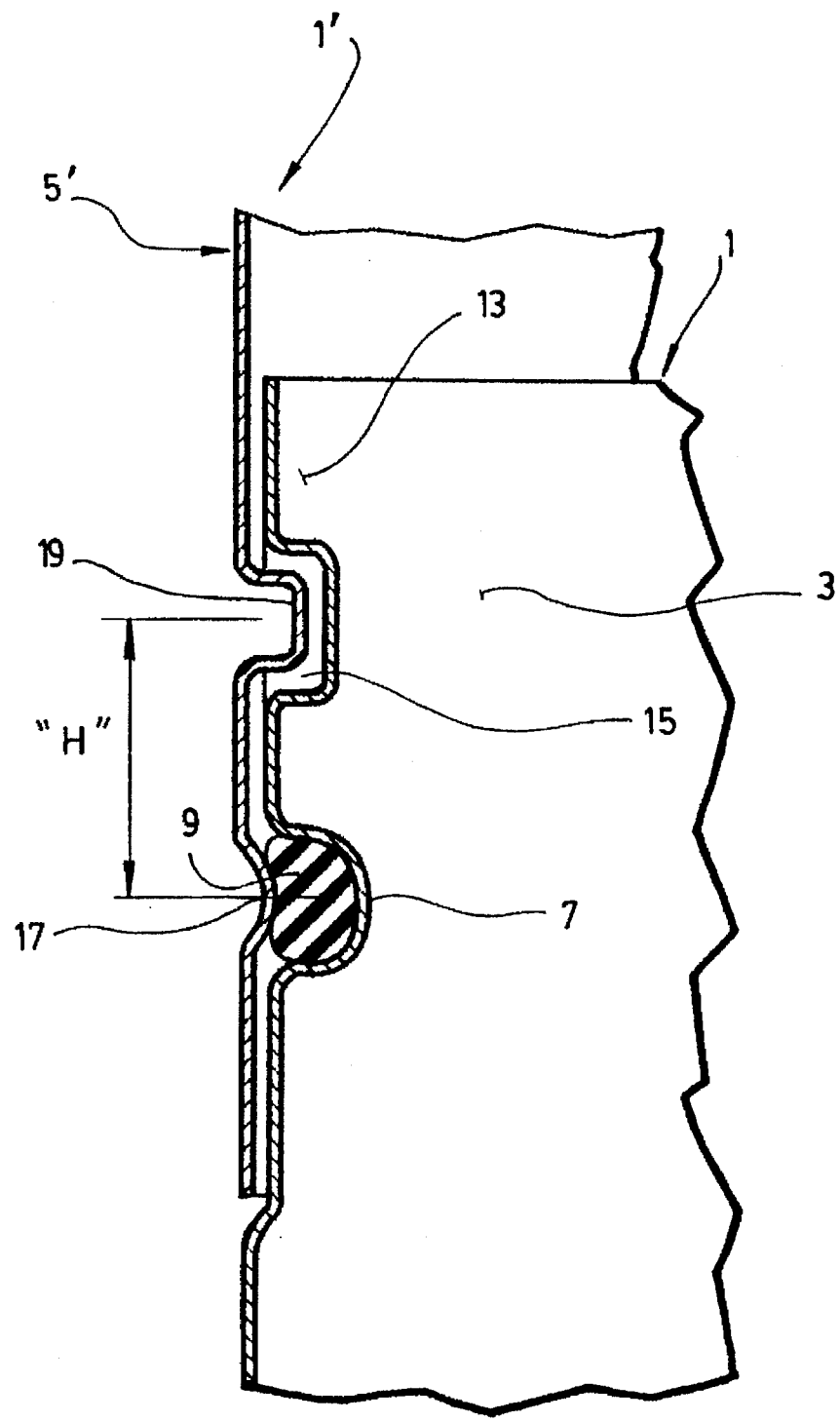
FIG. 3 is a partial longitudinal cross-section view of two flue sections according to the invention connected to each other.

As is shown in FIG. 3, the male end (3) further comprises a peripheral outwardly-opening recess (7) positioned at a distance "H" from the second arm (15) of the L-shaped grooves (11) and an O-ring (9) mounted in the recess (7) and protruding outwardly.

The female end (5') of the flue section (1') comprises a plurality of inwardly-projecting keys (19'), only two of which are visible on the perspective view of FIG. 2. The keys (19') are preferably four in number and are sized and shaped to engage the L-shaped grooves (11) of the male end (3) of another flue section (1) in order to lock the male end (3) into the female end (5') by insertion and twisting of the male and female end (3,5') together, thereby forming a "bayonet" type connection.

As is shown in FIG. 3, the female end (5') of the flue section (1') further comprises a peripheral inwardly-projecting boss (17') positioned at the distance "H" from the keys (19') in such a manner to be aligned and pressed against the O-ring (9) of the other flue section (1) and thus to make a tight seal when the male (3) of the other flue section (1) is fitted into the female end (5') of the flue section (1').

As is shown in FIG. 2, the male end (3) of the flue section (1) preferably has a length "L" and a flange (33) limiting its insertion within the female end (5') of the other flue section (1'). Accordingly, beyond this length "L", the diameter of the flue section (1) is increased to be equal to the diameter of the female end (5'). Consequently, the female end (5') cannot be fitted further than that length "L" of the male end (3) after which both diameters of the flue sections (1,1') are equal.

Figure 4:
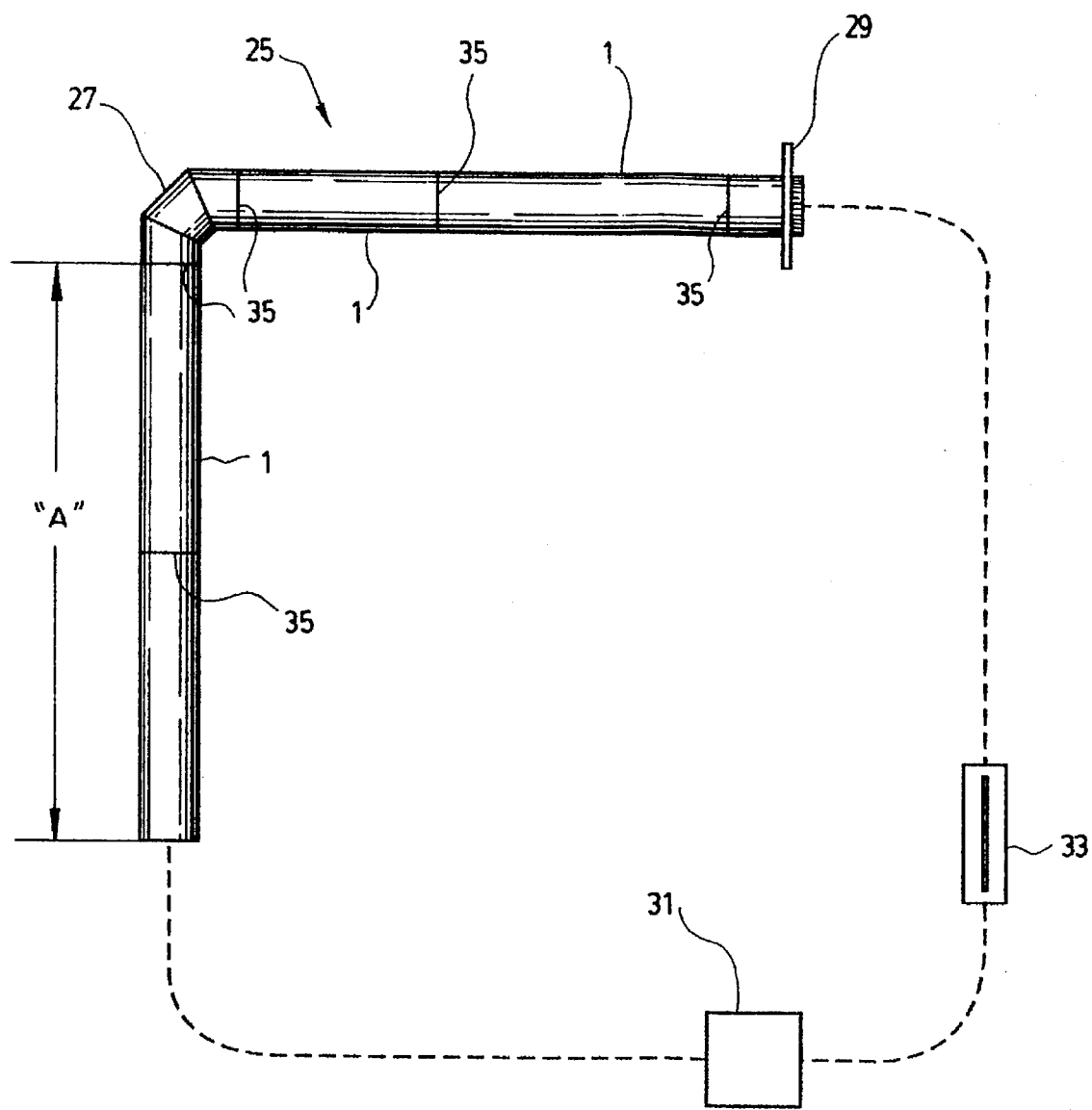
FIG. 4 is a schematic view of the assembly used to test the air tightness of the venting system according to the invention.

A diagram of the assembly of the venting system (25) used for testing the performances of the present invention is shown in FIG. 4. The venting system (25) comprises flue sections (1) connected to each other and incorporating a 90° bend (27). The system (25) is connected, for the purpose of the test, to a flow meter (33) measuring the volume of gas passing through a section of the venting system (25) and a water column (31) to measure the gas pressure inside the system.

Tests have been performed to determine the volume of gas leaking off the entire system (25) and at the level of each connections (35). The venting system (25) according to the invention should have a leak loss of less than 6 cubic feet per 3 hours, and preferably of less than 2, with an air pressure of 0,1 inch measured on the water column (or 25 Pa) on the longest configuration installation possible of the system (25). In fact, the leak loss measured was 1.83 cu. ft. per 3 hours, therefor 13 times less than the leak allotted by the CGA standard. More particularly, at each joint connection, the system should have a maximum leak loss of 1 cubic feet per 3 hours and preferably 0,4. In fact, the leak loss measured at each joint connection was 0.26 cu. ft. per 3 hours which is exceptional.

Of course, the above description of the invention could be extended to any variation that any person in the art would or could think of.

The embodiments of the invention in which an exclusive property or privilege is claimed are defined as follows:

1. A flue section having a pair of opposite ends of circular cross-section, one of said ends being a male end and shaped and sized to fit into the other end, wherein the other of said ends being a female end of a similar flue section, both of said ends having inner and outer surfaces, wherein said male end comprises:

at least two L-shaped grooves located on the outer surface of said male end, each of said L-shaped grooves having a first and a second arm, said grooves being positioned in such a manner to have the first arm opening at the male end of the flue section while the second arm extends toward the female end of said flue section at a fixed angle;

a peripheral outwardly-opening recess positioned at a distance H from the second arm of the L-shaped grooves; and an O-ring mounted in the recess and protruding outwardly;

said female end comprises:

at least two inwardly-projecting keys sized and shaped to engage the L-shaped grooves of the male end of another flue section in order to lock said male end into said female end by insertion and twisting of said male and female end together, thereby forming a bayonet type connection; and a peripheral inwardly-projecting boss positioned at the distance H from the keys in such a manner to be aligned and pressed against the O-ring of the other flue section and thus to make a tight seal when the male end of the other flue section is fitted into the female end of the flue section.

2. A flue section according to claim 1, wherein the male end is of a given length and comprises a flange limiting its insertion within the female end of another similar flue section.

3. A flue section according to claim 1, wherein the flue section is made of sheet metal, galvanized steel or aluminium and stainless steel.

4. A flue section according to claim 2, wherein the flue section is made of sheet metal, galvanized steel or aluminium and stainless steel.

5. A flue section according to claim 3, wherein the grooves and the recess of the male end and the keys and the boss of the female end are punched in.

6. A flue section according to claim 4, wherein the grooves and the recess of the male end and the keys and the boss of the female end are punched in.

7. An airtight venting system comprising a plurality of flue sections connected in line to each other, each of said flue sections having a pair of opposite ends of circular cross-section, one of said ends being a male end and shaped and sized to fit into the other end, wherein the other of said ends being a female end of a similar flue section, both of said ends having inner and outer surfaces, wherein said male end comprises:

at least two L-shaped grooves located on the outer surface of said male end, each of said L-shaped grooves having a first and a second arm, said grooves being positioned in such a manner to have the first arm opening at the male end of the flue section while the second arm extends toward the female end of said flue section at a fixed angle;

a peripheral outwardly-opening recess positioned at a distance H from the second arm of the L-shaped grooves; and an O-ring mounted in the recess and protruding outwardly;

said female end comprises:

at least two inwardly-projecting keys sized and shaped to engage the L-shaped grooves of the male end of another flue section in order to lock said male end into said female end by insertion and twisting of said male and female end together, thereby forming a bayonet type connection; and a peripheral inwardly-projecting boss positioned at the distance H from the keys in such a manner to be aligned and pressed against the O-ring of the other flue section and thus to make a tight seal when the male end of the other flue section is fitted into the male end of the flue section.

8. A system according to claim 7, wherein the male end is of a given length and comprises a flange limiting its insertion within the female end of another similar flue section.

9. A system according to claim 7, wherein said system has a maximum leak loss of 6 cubic feet per 3 hours with an air pressure of 25 Pascals.

10. A system according to claim 9, wherein the maximum leak loss is 2 cubic feet.

\* \* \* \* \*